H. J. GEAKE.
TIRE CLAMP.
APPLICATION FILED AUG. 24, 1915.
1,199,686.
Patented Sept. 26, 1916.
Fig. 1.
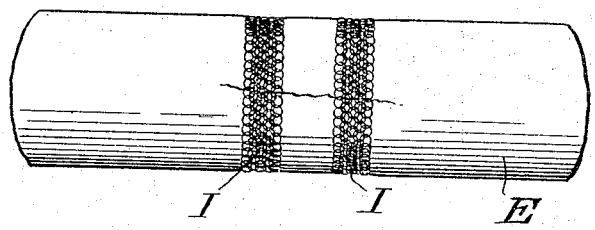
Fig. 2.
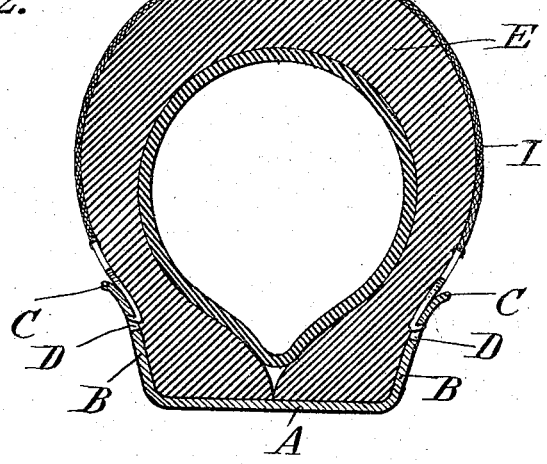
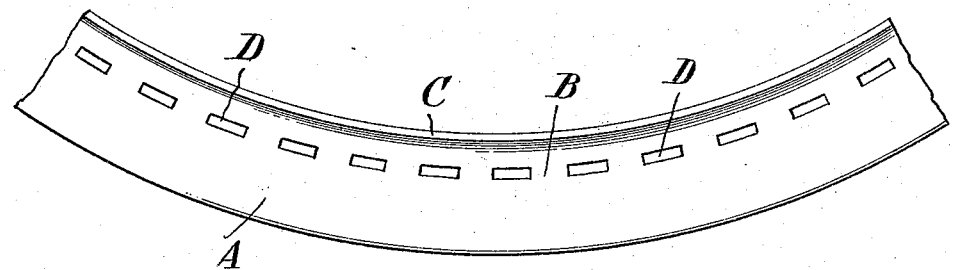
Fig. 3.
Witnesses
Fenton N. Belt
J. H. Sherwood
Inventor
Harry J. Geake
By Frankl. N. Hough
Attorney

UNITED STATES PATENT OFFICE.

HARRY JAMES GEAKE, OF VICTORIA, BRITISH COLUMBIA, CANADA.

TIRE-CLAMP.

1,199,686.   Specification of Letters Patent.   Patented Sept. 26, 1916.

Application filed August 24, 1915. Serial No. 47,110.

*To all whom it may concern:*

Be it known that I, HARRY J. GEAKE, a citizen of the United States, residing at Victoria, in British Columbia, Canada, have invented certain new and useful Improvements in Tire-Clamps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in means for fastening straight side tires to the rims of wheels and consists of a simple and efficient device of this nature having various details of construction, combinations and arrangements of parts which will be hereinafter fully described, shown in the accompanying drawings and then specifically defined in the appended claim.

My invention is illustrated in the accompanying drawings, in which:

Figure 1 is a cross sectional view showing the application of my device to the rim of a wheel. Fig. 2 is a view in elevation of a slotted flange of the rim.

Reference now being had to the details of the drawings by letter, A designates the rim of a wheel which has its opposite edges bent to form flanges B, the extreme ends C of which are outwardly curved to provide a camming surface as shown in the sectional view of the drawings. Said wings or flanges are provided with series of elongated slots D, remote from the end C shown clearly in Fig. 2 of the drawings, and which are spaced apart. A tire, designated by letter E, engages the rim and a tire clamp I to said tire passes about the latter and its ends are disposed intermediate the circumference of the tire and the flanges of said rim.

By the provision of my invention, it will be noted that a series of elongated slots or perforations are made through the metal comprising the Detroit rim and other similar patterns of rims for straight side tires, thus enabling one to secure the benefit of clamps which have heretofore been confined in use solely to the type of rims having an inserted ring as a part of the rim. Heretofore, in the event of a blow out on a rim of the type described, it was necessary to use a laced patch but, by the present invention, in the provision of the series of holes in the rim, a clamp may be used, thus adapting said type of rim to clamps as set forth.

Tire clamps or binders, designated by letter I, are composed preferably of a series of intermeshed steel rings of suitable size and of sufficient length as a whole, securely fastened together and provided with hooks C' which are adapted to engage the slots or holes formed in the rims. These holes or slots, as clearly shown in Fig. 2, are larger than the extreme ends of the hook portions of the laced patches, whereby the extreme ends of the hooks C' may engage the camming surface of the rim and be guided to any portion of the slots D with the result that the pressure of the air in the tire causes the hooks to position themselves in the slots. It might be further stated that the extreme ends of the hooks extend at an angle with relation to the body portion thereof, thereby providing a camming surface to coöperate with the camming surface of the rim, whereby these patches may be applied while the tire is inflated.

What I claim to be new is:—

In combination with a wheel rim having its opposite edges extending outwardly to form a camming surface, said rim having slots remote from the outer edge thereof and a tire supported on said rim, a laced patch having its ends terminating in hook members, the extreme free ends of the hook members extending rearwardly at an angle with relation to the body portion thereof, to provide a camming surface to coöperate with the camming surface of the rim for guiding the extreme free ends of the hook members into the slots of the rim, said slots being larger than the extreme free ends of the hook members to permit the hook members to find their way into the slots, whereby they will automatically position themselves.

In testimony whereof I hereunto affix my signature in presence of two witnesses.

HARRY JAMES GEAKE.

Witnesses:
FRANK V. JOHNSON,
R. M. NEWCOMB.

Copies of this patent may be obtained for five cents each, by addressing the "Commissioner of Patents, Washington, D. C."